2,995,814
METHOD FOR SOLDERING ALUMINUM
Harold A. Chamness, 27 N. Tremont Ave., Indianapolis, Ind.
Filed Oct. 11, 1957, Ser. No. 689,738
1 Claim. (Cl. 29—492)
(Granted under Title 35, U.S. Code (1952), sec. 266)

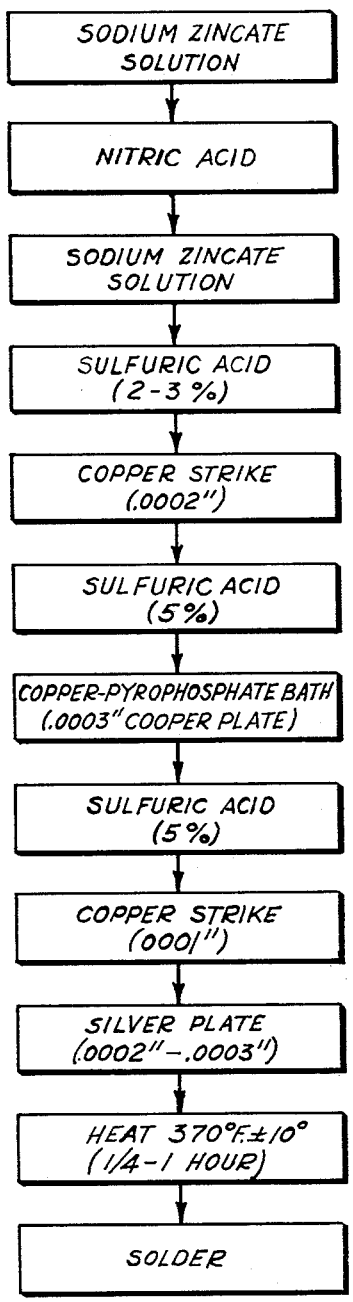

The invention described herein may be manufactured and used by or for the Government of the United States of America for governmental purposes without the payment of any royalties thereon or therefor.

The present invention relates to a method of soldering plated aluminum. Heretofore various attempts have been made to plate aluminum and then perform soldering operations on the plated aluminum. However, invariably the plated metals, which are relatively thin, would peel or blister, thus resulting in an undesirable end product.

The term "soldering" is generally understood to mean the joining of two metal surfaces by means of another metal or alloy that is applied in the molten condition; the metal or alloy used as a bond is the solder. One of the requisites for a solder is that its melting point must be considerably lower than that of the metals being joined.

Aluminum solders, that is, those solders used with aluminum articles, normaly contain 50 to 75 percent of tin, with the remainder usually being zinc. However, as a soldered joint of aluminum will corrode rapidly in moist atmospheres, it is preferable to join aluminum and its alloys either by welding or by applying a protective plated coating that will prevent corrosion. These protective plated coatings normally have melting points substantially greater than the melting points of the solder being applied; yet, heretofore, the soldering of plated aluminum resulted in blistering and peeling of the plated material from the base metal.

The present invention provides an improved method of soldering plated aluminum by first providing a coating of zinc to the aluminum to be soldered, then providing one or more coatings of copper, followed by a layer of silver. The plated aluminum is then aged by heating at a temperature of 3700 F. for a period between ¼–1 hour and, after cooling, the plated aluminum is soldered in any conventional manner. The resulting end product is free of blisters and peels.

It is therefore a general object of the present invention to provide an improved method of soldering aluminum.

Another object is to provide an improved method of soldering plated aluminum so as to prevent blistering or peeling of the plated material from the base metal.

Other objects and many of the attendant advantages of this invention will be readily appreciated as the same becomes better understood by reference to the following detailed description when considered in connection with the accompanying drawing which is a flow diagram showing the principal steps of the present invention.

Aluminum reacts rapidly with oxygen to form thin oxide coatings on the surface thereof, and this oxide interferes with the obtaining of an active aluminum surface. This oxide can be removed in various manners, one suitable one being by using an alkali cleaner. These alkali cleaners are of two types, etching and nonetching, the former working very rapidly and being very effective if the finished product can tolerate an etched surface.

After the aluminum has been thoroughly cleaned, it is given a coating of zinc by the so-called "double-dipping" technique. This consists in immersing in a sodium zincate solution for a period between ¼–2 minutes, then removing the deposited zinc film with nitric acid, and then immersing again in the sodium zincate solution for 15–30 seconds. It is believed that a more adherent film of zinc is obtained in the second zincate dip because the more active areas on the aluminum surface would have been preferentially dissolved in the first zincate dip.

After the aluminum specimen is removed from the second sodium zincate bath, it is rinsed, dipped in a 1% solution of sulfuric acid for a period of 2–3 seconds, rinsed, and then given a strike coating of copper of approximately .0002". The following bath and operating conditions are employed:

Bath analysis
12–14 g./l. copper

3–5 g./l. free cyanide

Operating conditions
Bath pH _____ 10.7–11
Anodes _____ Copper
Temperature, °F _____ 70°–90°

The specimen is then rinsed, neutralized in a 5% solution of sulfuric acid, rinsed, and then plated with approximately .0003" copper in a copper-pyrophosphate bath having the following bath analysis and operating conditions:

Bath analysis
18.5–30 g./l. copper

130–210 g./l. pyrophosphate ($P_2O_7$)

1.5–3.0 g./l. ammonia

Operating conditions
Bath pH _____ 8.2–8.8
Anodes _____ Electrolytic copper
Temperature _____ °F __ 110–140
Cathode current density _____ amps./sq. ft. __ 10–70
Anode current density _____ amps./sq. ft. __ 20–100
Tank voltage _____ volts __ 2–5

The specimen is then rinsed, neutralized in a 5% solution of sulfuric acid, rinsed, and then returned to the copper-cyanide bath for an additional strike coating of copper of approximately .00005–.0001 inch. The specimen is next plated with .0002–.0003 inch of silver in a standard silver plating bath and then heated at 370° F.± 10° for a period between ¼–1 hour. The specimen can now be readily soldered or parts can be attached thereto by soldering without any resulting blistering or peeling of the plated materials from the base aluminum.

As the heating of the plated base aluminum is substantially below the melting point of the plated materials, it is believed that the heating somehow cures or ages the specimen, thus providing a more adherent bond between the base material and the plated material. Thus the specimen is not readily affected by localized heating due to soldering.

Obviously many modifications and variations of the present invention are possible in the light of the above teachings. It is therefore to be understood that the invention may be practiced otherwise than as specifically desired.

What is claimed:

A method of joining two metals at least one of which is aluminum comprising, first immersing said aluminum in a sodium zincate solution for a period between ¼–2 minutes, then removing the deposited zinc film with nitric acid, then immersing again in a sodium zincate solution for a period between 15–30 seconds, then applying a strike coating of copper on said aluminum, next applying approximately .0003 inch of copper by plating in a copper-pyrophosphate bath, next applying another strike coating of copper, then plating silver over the copper plating, then heating said plated aluminum for a period between ¼–1 hour at a temperature of approximately 370° F. and then joining said two metals at their surfaces with a metal alloy in a molten condition.

References Cited in the file of this patent

UNITED STATES PATENTS

| | | |
|---|---|---|
| 1,005,629 | Fisher | Oct. 10, 1911 |
| 1,317,351 | Chadwick | Sept. 30, 1919 |
| 1,567,625 | Smith | Dec. 29, 1925 |
| 2,392,917 | Guinee | Jan. 15, 1946 |
| 2,513,365 | Rogoff | July 4, 1950 |
| 2,526,544 | DeLong | Oct. 17, 1950 |
| 2,539,246 | Hensel | Jan. 23, 1951 |
| 2,539,247 | Hensel | Jan. 23, 1951 |
| 2,650,886 | Zelley | Sept. 1, 1953 |
| 2,709,847 | Ihrie et al. | June 7, 1955 |
| 2,731,403 | Rubin | Jan. 17, 1956 |
| 2,748,067 | Pease et al. | May 29, 1956 |
| 2,781,577 | Smellie | Feb. 19, 1957 |
| 2,856,333 | Topelian | Oct. 14, 1958 |
| 2,887,766 | Fike et al. | May 26, 1959 |
| 2,891,309 | Fenster | June 23, 1959 |

FOREIGN PATENTS

| | | |
|---|---|---|
| 655,737 | Great Britain | Aug. 1, 1951 |
| 26,375 | Great Britain | of 1903 |